United States Patent
Stiesdal

(10) Patent No.: US 12,366,312 B2
(45) Date of Patent: Jul. 22, 2025

(54) METHOD OF CONNECTING TUBULAR MEMBERS IN OFFSHORE STRUCTURES

(71) Applicant: Stiesdal Offshore A/S, Give (DK)

(72) Inventor: Henrik Stiesdal, Odense C (DK)

(73) Assignee: Stiesdal Offshore A/S, Give (DK)

( * ) Notice: Subject to any disclaimer, the term of this patent is extended or adjusted under 35 U.S.C. 154(b) by 146 days.

(21) Appl. No.: 18/509,840

(22) Filed: Nov. 15, 2023

(65) Prior Publication Data

US 2024/0110651 A1  Apr. 4, 2024

Related U.S. Application Data

(63) Continuation of application No. PCT/DK2022/050094, filed on May 9, 2022.

(30) Foreign Application Priority Data

May 17, 2021 (DK) .......................... PA 2021 00502

(51) Int. Cl.
*F16L 23/036* (2006.01)
*B23P 11/02* (2006.01)
*F16L 23/20* (2006.01)

(52) U.S. Cl.
CPC ........... *F16L 23/036* (2013.01); *B23P 11/025* (2013.01); *F16L 23/20* (2013.01); *Y10T 29/49865* (2015.01); *Y10T 403/48* (2015.01)

(58) Field of Classification Search
CPC ....... F16L 23/036; F16L 23/20; B23P 11/025; Y10T 29/49865; Y10T 403/48
See application file for complete search history.

(56) References Cited

U.S. PATENT DOCUMENTS

| | | | | |
|---|---|---|---|---|
| 2,359,996 A | * | 10/1944 | Kunkel | B22C 21/08 269/217 |
| 3,524,665 A | | 8/1970 | Hohn et al. | |
| 4,702,673 A | * | 10/1987 | Hansen | F01D 5/3046 29/447 |
| 4,813,807 A | * | 3/1989 | Mead | F16B 5/0664 29/447 |
| 10,584,816 B2 | | 3/2020 | Klausmann | |
| 2016/0377198 A1 | | 12/2016 | Larsen et al. | |

FOREIGN PATENT DOCUMENTS

| | | | | |
|---|---|---|---|---|
| CH | 423209 A | | 10/1966 | |
| DE | 935102 C | * | 11/1955 | ............ F16L 23/036 |
| DE | 2435252 A1 | | 2/1976 | |
| GB | 2459442 A | | 10/2009 | |
| JP | 2017003030 A | | 1/2017 | |
| KR | 20100087978 A | | 8/2010 | |
| KR | 101159146 B1 | | 6/2012 | |
| WO | 9012237 A | | 10/1990 | |
| WO | WO-9012237 A1 | * | 10/1990 | ............ B23P 11/025 |
| WO | WO-2010089065 A1 | * | 8/2010 | ............ F16L 23/036 |

* cited by examiner

*Primary Examiner* — Jermie E Cozart
(74) *Attorney, Agent, or Firm* — Elevated IP, LLC

(57) ABSTRACT

Two adjacent pipe flanges are secured by a plurality of clamp units, where each clamp unit, in order to receive the adjacent flanges in its receptacle, is thermally expanded.

19 Claims, 8 Drawing Sheets

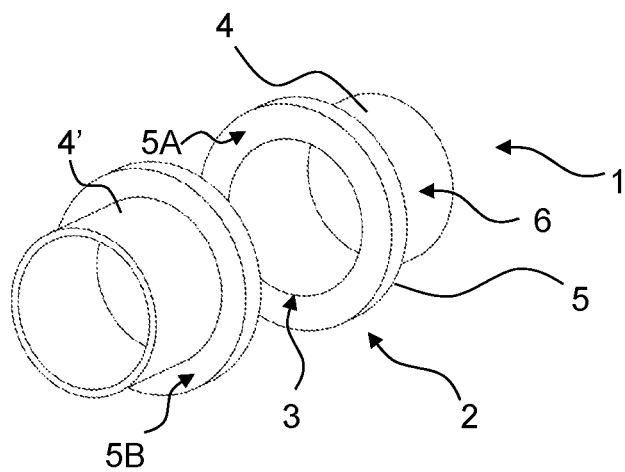
FIG. 1A
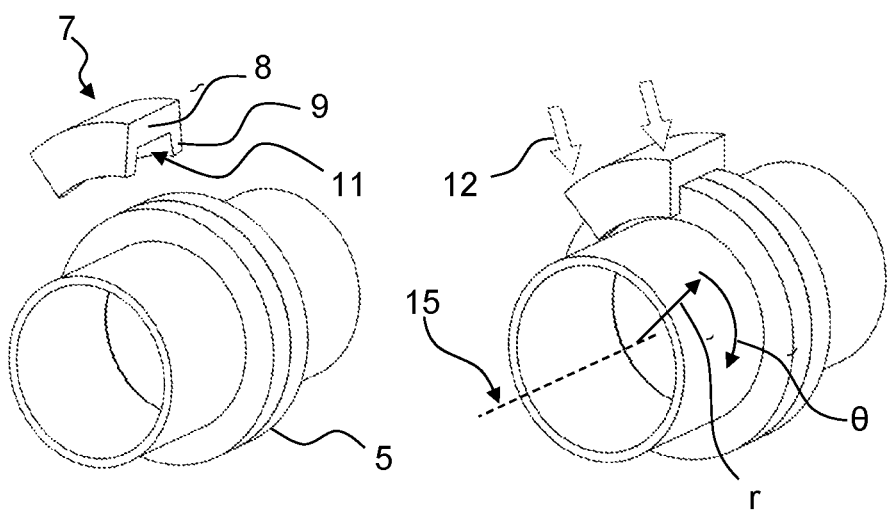
FIG. 1B
FIG. 1C
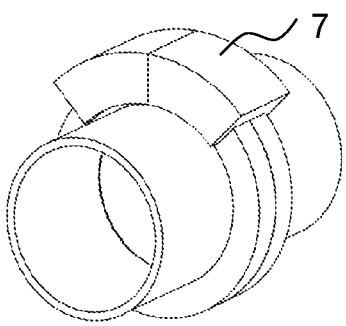
FIG. 1D
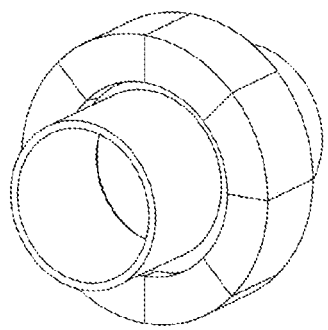
FIG. 1E

METHOD OF CONNECTING TUBULAR MEMBERS IN OFFSHORE STRUCTURES

CROSS-REFERENCE TO RELATED APPLICATIONS

This application is a continuation under 35 U.S.C. 111 of International Patent Application No. PCT/DK2022/050094, filed May 9, 2022, which claims the benefit of and priority to Danish Application No. PA 2021 00502, filed May 17, 2021, each of which is hereby incorporated by reference in its entirety.

FIELD OF INVENTION

The present invention relates to methods of connecting pipelines or other large-diameter tubular members in offshore structures by securing adjacent flanges to each other.

BACKGROUND

Typically, for connecting pipelines to each other or to pumping stations, the pipelines are provided with flanges at their ends. For example, the flanges are provided as a collar around the pipe end section. For interconnection, the flanges have through-going holes for bolts that pull the two adjacent flanges together when tightened.

In the event that the collars are not provided with holes for bolts, US2016/377198 discloses an alternative connector including two groups of clamp seats positioned against the rear sides of both adjacent collars and which are then connected with bolts, in this way providing the bolt holes that are missing in the collars. Bolted clamping units on pipes are also disclosed in Korean patent KR101159146B1 and Korean patent application KR20100087978A. German patent application DE2435252A1 discloses a U-shaped pipe connector without bolts, which clamps two flanges of polymer fresh-air pipes together by its elastic force. A further alternative is disclosed in CH423209A, in which a pre-deformed polymer clamp is positioned over two adjacent flanges of water pipes and then heated, wherein the heating leads to release of pre-induced contraction forces.

An alternative connector for pipes with end flanges is disclosed in U.S. Ser. No. 10/584,816 in which a plurality of clamping units is positioned along the collars about the pipe section and clamps angular segments of the adjacent collars together. The clamping units are tightened by a screw mechanism.

In either case, the pipe connections comprise bolts which fulfill the initial purpose of tightening the flange connection but which in some cases suffer from a loss of tightness with time due to material creep in the bolts or in a tightening gasket between the flanges. Especially, for deep-sea pipelines, a renewed tightening of the bolts is very difficult, which is why it would be desirable if a different long-term pipe connection would be available for large-diameter pipe connections in offshore constructions.

BRIEF DESCRIPTION

It is an objective of this disclosure to provide an alternative connection for large-diameter tubular members in offshore structures, for example connections of pipes to pumps or to other pipes. This objective and further advantages are achieved with a method of connecting tubular members in offshore structures as described herein.

In short, the method comprises securing two adjacent pipe flanges by a plurality of clamp units, where each clamp unit, in order to receive the adjacent flanges in its receptacle, is thermally expanded.

The devices and methods disclosed are directed towards large-diameter tubular members, having a diameter of more than 1 m, typically larger than 2 m.

As mentioned in the introduction, pipes and other tubular members in the offshore industry, typically, are provided with a radially outward projecting flange at their ends for connecting the tubular members end-to-end after having been positioned with the flanges adjacent to each other.

For securing the adjacent flanges to each other, a plurality of clamp units is provided and positioned on various predetermined segments of the adjacent flanges. In typical designs of flanges on pipe sections, be it for pipes or for other components, such as pumps, such a flange comprises a collar around the cylindrical wall at the end of the pipe section.

Each clamp unit has a base comprising a first portion from which opposite jaws extend to form a receptacle therebetween for receiving and containing one of the predetermined segments.

For example, for the large diameter tubular members, the length of the jaws is in the range of 100-400 mm. Examples of widths W across the receptable between the jaws is in the range of 200-600 mm.

The term "predetermined segment" is used here for that part of the flange that is accommodated inside the receptacle. In some cases, the predetermined segment is approximately an entire angular segment of a collar of the flange. However, often, the predetermined segment is a portion of the total angular segment of the collar. This is especially so, if the flange, for example the collar, also comprises bolts extending through both flanges for additionally securing the adjacent flanges to each other. In the latter case, the clamp units and bolts imply a double security.

A typical angular span of a clamp unit is less than ⅙ of the circumference of the flanges. In order to provide equal pressure, at least three clamp units are positioned on the flanges, preferably with equal angular distance about the tubular member. However, typically, more than three clamp units are provided, for example at least 6 or 8. Often, the number of clamp units in combination span all the way around the circumference of the flange.

The receptacle has a width W between the opposite jaws. The clamp unit is designed, relative to the thickness of the combination of the adjacent flanges, such that the width is too small for the receptacle to take up the predetermined segment of the adjacent flanges, when the first portion of the base is at ambient temperature. For actually receiving the predetermined segment of the adjacent flanges in the receptacle, the first portion of the base is heated so that, by thermal expansion of the first portion, the width W of the receptacle is increased.

For example, a heater is provided between the jaws and directing heat towards the first portion of the base, for example by attaching electrical heating members to the first portion of the base or by directing a gas flame towards it. After heating, the heater is removed prior to the clamp unit being positioned on the flanges. In principle, however, it is also possible to integrate a heater in the base. For example, electrical heating probes that heat specific parts of the base when electrical current is applied may be integrated in the base.

Once the width of the receptacle is increased, the clamp unit is positioned on the adjacent flanges with the predetermined segment of the adjacent flanges inside the receptacle. After the positioning, the temperature of the first portion is reduced again to ambient temperature, which leads to thermal contraction of the first portion with a result of decreasing the width W between the jaws so that the adjacent flanges are pressed together by the jaws due to the contraction.

For example, the width between jaws may be increased evenly by the heating. This can be achieved by heating not only the first portion of the base but heating the entire base in order to provide an even expansion of the base.

However, a useful alternative has been found in uneven increases of the width between the jaws. In this case, the base is heated unevenly so that more thermal expansion is achieved on the first portion than a second portion of the base, where the two portions are mechanically connected to each other. In some embodiments, the second portion is remote from the jaws and facing away from the flanges when the clamp unit is mounted on the flanges.

For example, the first portion and the second portion of the base are portions of a metal block, optionally steel or cast iron. For example, the two portions are integral parts of a metal block, where the metal block has been provided as a single piece of metal of which the two portions are respective, opposite portions of the piece.

Alternatively, an insulating space is provided between the first and the second portion of the base for preventing or delaying transfer of thermal energy from the first to the second portion during the heating. Optionally, the first and second portion are two metal blocks that are mechanically connected at their ends. In other embodiments, the metal block has a box-profile with a void extending through the middle of the block. In order to reach the second portion, heat from the first portion has to be conducted around the void. Such an arrangement delays the thermal conduction from the first to the second portion.

By causing more thermal expansion of the first portion than the second portion, due to heating of the first portion but not the second portion, the first portion expands more than the second portion, which causes an uneven expansion of the base. As the first portion is close to the jaws and the second portion distal to the jaws, this uneven expansion, correspondingly, changes the angle between the jaws with a larger increase of width of the receptacle at an edge of the receptacle distal to the first portion. For positioning the clamp unit, this is useful in that the advancing of the clamp unit onto the flanges is facilitated, once the edges of the adjacent flanges are received in the gap between the jaws at the edge of the receptacle.

For example, if the predetermined segment of the adjacent flanges has a largest thickness $T_{max}$, and the width of the receptacle is increased by the heating to at least $T_{max}$ for fitting the clamp unit over the predetermined segment.

This is a necessity for proper fitting of the predetermined segment into the receptacle if the jaws have parallel inner sides towards the receptacle with a width $W_0$ and the flanges parallel rear sides with a thickness $T_0$. In this case, the predetermined segment has a constant thickness $T_0 > W_0$, which requires thermal expansion for increasing the width of the receptacle to larger than the thickness $T_0$.

Increasing the width of the receptacle by the heating to at least $T_{max}$ is also a necessity when the predetermined segment of the adjacent flanges has an increasing thickness in a radial direction, for example a linearly increasing thickness, making the segment thickest where the jaws start receiving the predetermined segment.

For example, the profile of the predetermined segment has a thickness that increases from a smallest to a largest thickness $T_{max}$ over a distance D in an outward radial direction. The receptacle is then provided with a corresponding internal profile with increasing, for example linearly increasing, width W to a maximum width $W_{max} = T_{max}$ towards the base over a corresponding distance D'. The angle between the jaws is then increased by the uneven thermal expansion of the base, causing a larger increase of width of the receptacle at the edge closer to the first portion, for passing the edge of the receptacle over the segment at the position of the largest thickness $T_{max}$.

In contrast to the above example, increasing the width of the receptacle by heating to at least $T_{max}$ over the entire receptacle is not always a necessary condition, which will become apparent from the discussion below.

In some embodiments, at least one of the jaws has a convex curved surface on a side towards the receptacle. Optionally, the convex curved surface is provided in the radial direction so that the width as a function of polar angle along the receptacle is constant but curved in the radial direction. Alternatively, the curved surface is provided as a convex curved projection that extends from the jaw into the receptacle. Several of such projections can be provided on the inner side of at least one of the two jaws. If such projections are provided on both jaws, the positions of the projections need not be face-to-face but can be distributed differently on one jaw than on the other.

Such curved surface, for example projections, can be used for providing additional elastic pressure force on the flanges. For this purpose, the width of the receptacle is increased sufficiently by the thermal expansion to receive only a part of the predetermined segment between the jaws but not increased sufficiently for the predetermined segment to also pass an extreme position of the convex curved surface towards a predetermined final location of the predetermined segment inside the receptacle. For the predetermined segment to pass the extreme position, the clamp unit is advanced with an increased advance force which is overcoming an elastic force of the material of the jaws and, typically to a minor extent, the base. With this additional force, the jaws are pressed sufficiently away from each other in order for the predetermined segment to pass the extreme position. Once, the predetermined segment has reached its predetermined position inside the receptacle, the elastic force of the jaws at the extreme position is increased by the thermal contraction when reducing the temperature of the first portion to ambient temperature. For example, the extreme position may define a minimum width $W_{min}$ of the receptacle.

The force necessary to overcome the obstacle caused by the curved surface, for example projection, depends on the material of the jaws, the distance by which the jaws have to be pressed apart for giving way to the predetermined segment of the adjacent flanges, as well as the position of the obstacle because an obstacle near the edge of the receptacle is easier pressed out of the way than an obstacle close to the base. It also depends on how the curved surface is formed. For example, if the curve has a small, possibly constant, inclination towards the edge of the receptacle, the flanges start pressing the jaws away from each other from an early stage of the insertion and over a relatively long distance, which makes the pressing-apart of the jaws possible with relatively low additional advance force.

For example, the extreme position of the curved surface may require an additional 1 mm of the jaws being pressed apart for the segment to pass the obstacle, and if the small inclination of the curve toward the edge is over 200 mm, the flanges would have to be pressed as little as 1/200=5 micrometre apart for each millimetre of advance, which minimizes the necessary force to press the jaws apart. Typically, the width by which the jaws have to be pressed additionally apart by the increased advance force is in the range of 0.5-3 mm, in order for the predetermined segment to pass the extreme position freely into the receptacle.

After having positioned the predetermined segment inside the receptacle at the predetermined position, and when the base has been cooled down again, the curved surface puts additional concentrated elastic force onto the flanges, with a higher force the closer the extreme position of the convex curved surface is to the base relative to the edge of the receptacle. Even if the material of the clamp unit and the material of the flanges, or a possible gasket between the flanges, is subject to long-term creep of the material, the curve, for example in the form of projections, maintain elastic pressure on the flanges.

Optionally, the flanges are provided with a plurality of bolt holes about the tubular member and tightened bolts extend through the holes as an additional measure for securing the flanges to each other. In this case, it is useful if the jaws of each clamp unit extend on the flange segment to locations in between the bolts for optimizing the pressure area, however, leaving areas free around the bolts for tightening the bolts.

BRIEF DESCRIPTION OF THE DRAWINGS

The invention will be explained in more detail with reference to the drawings, where:

FIG. 1A illustrates two pipe sections with collars;

FIG. 1B illustrates the two pipe sections of FIG. 1A end-to-end;

FIG. 1C illustrates placement of a clamp unit on an angular segment on the collars;

FIG. 1D illustrates two clamp units on the collars;

FIG. 1E illustrates eight clamp units on the collars;

DETAILED DESCRIPTION

Figure 2:
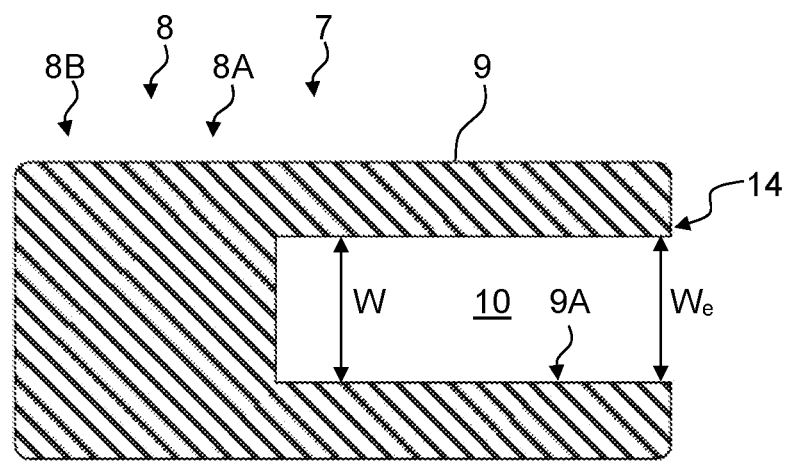
FIG. 2 is a cross sectional view of a clamp unit.

FIG. 1A shows two tubular structures 1, each of which has a flange 2 at an end 3 of a cylindrical pipe section 4, 4'. For example, one pipe section 4 is an end section of an offshore pipe, and the other pipe section 4' is part of a pump that is to be connected to such offshore pipe.

The flange 2 comprises a collar 5 around the pipe section 4 and fastened to an outer surface 6 of the pipe section 4, 4', which is a typical construction. However, the flange 2 could also be fastened to the end 3 of the pipe section 4 in longitudinal extension of the pipe section 4, instead of around the end 3 of the pipe section 4.

The collar 5 has a front side 5A and a rear side 5B, which are parallel, although this is not necessary, as will be explained below with examples. In the shown embodiments, the collar 5 has a circular outline, which is a typical case but not necessary for the invention disclosed herein.

FIG. 1B illustrates the situation where the two pipe sections 4, 4' have been positioned end-to-end with the two flanges 2 adjacent to each other, and the collars 5 facing each other. In the shown sketch, for simplicity, the two collars 5 are abutting each other, although this is not always the case, as there may be positioned a gasket in between the flanges 2. A clamp unit 7 has a base 8 and two jaws 9 extending from one side of the base 8 for providing a receptacle 10 in between the jaws 9.

A segment 11 of the adjacent flanges 2 is taken up in the receptacle 10 by moving the clamp unit 7 over the collars 5, which is illustrated by arrows 12 in FIG. 1C.

In the illustrated situation, the receptacle 10 is taking up a complete angular segment of the adjacent collars 5. However, the segment 11 that is taken up in the receptacle 10 need not be a complete angular segment of the collars 5 but could also be a portion of the adjacent flanges 2 less than the entire angular segment of the collars 5.

FIG. 1D illustrates a situation where two clamp units 7 have been placed side-by-side on the collars 5. By continuing to position the clamp units 7 side-by-side about the collar 5, the entire collars 5 can be taken up by the multiple receptacles 10, which is illustrated in FIG. 1E.

FIG. 2 illustrates a cross section of a clamp unit 7. The clamp unit 7 has a base 8 and two jaws 9 extending from a first portion 8A of the base 8 for providing a receptacle 10 in between the jaws 9. The distance between the jaws 9 defines a width W of the receptacle 10. In the shown embodiment, the jaws 9 have parallel sides 9A towards the receptacle 10 so that the width W across the receptacle 10 is constant and the width $W_e$ at the outer edge 14 of the receptacle 10 is the same as at any position between the jaws 9. However, as will be explained by examples below, this constant width W need not be the case, as also the rear sides 5B of the collars 5 need not be parallel.

For a varying width W, the width is a function of the position in the receptacle. For example, W is expressed as a function depending on polar coordinates, W=funct (r,θ), a radial coordinate r and an angular coordinate θ, the reference for the coordinates being taken from the central longitudinal axis 15 of the pipe section 4, see FIG. 1C for the central axis and the coordinates. In this case, the width W is measured in a direction parallel to the central longitudinal axis 15. However, other expressions for W are possible.

Figure 3A:
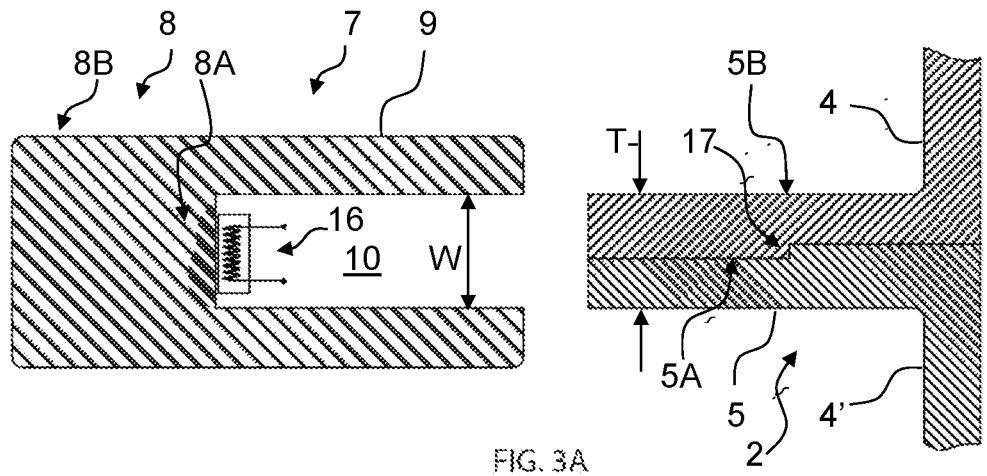
FIG. 3A illustrates a cross sectional view of a clamp unit and adjacent flanges.

In FIG. 3A, a cross section of the two adjacent collars 5 is show together with a portion of the two pipe sections 4, 4'. The front sides 5A of the two collars 5 are exemplified with a step 17 for precise fitting and for avoiding mutual sliding of the collars 5 when a clamp unit 7 is positioned onto the collars 5.

In order for the clamp unit 7 to actually clamp the two flanges 2 towards each other by the collars 5 and keep them in place, the jaws 9 of the clamp unit 7 need to exert pressure on the flanges 2.

The collars 5 of the adjacent flanges 2 have a thickness T, when measured between the parallel outer sides 5B of the collars of the flanges 2, which is slightly larger than the width W of the receptacle 10 of the clamp unit 7. In order to make the width W fit the thickness T, the base 8 is heated by a heat source 16 so that it undergoes thermal expansion. For example, the base 8 is heated from ambient temperatures of 15° C. to more than 150° C., for example in the range of 150° C. to 300° C., for increasing the width W in the range of 0.5-3 mm at the edge of the receptacle.

A typical expansion coefficient for metal, such as steel, is on the order of $10^{-5}$ per degree Kelvin. For W=400 mm, a heating by 250 Kelvin from 15° C. to 265° C. results in an expansion of the first portion of $10^{-5} \times 250 \times 400 = 1$ mm. For precisely made jaws and collars, this can be sufficient for fitting the clamp unit 7 over the collars 5.

Figure 3B:
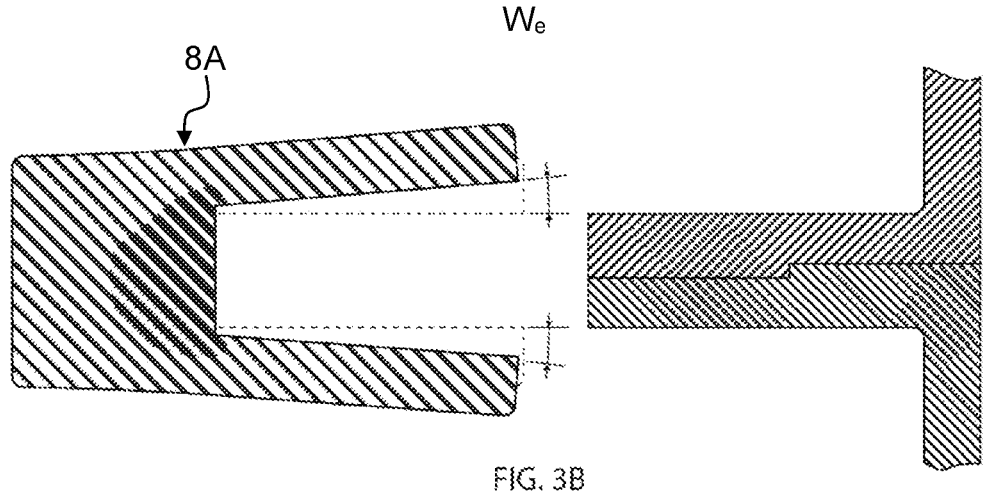
FIG. 3B illustrates inclined jaws due to uneven thermal expansion of the base.

However, an improved method has been found as illustrated in FIG. 3B. In this case, the heating of the base 8 is made such that the base 8 is heated unevenly. The heat is provided to a first portion 8A of the base 8, while the second portion 8B will not be heated or only be heated delayed by thermal conduction from the first portion 8A to the second portion 8B. Due to the higher temperature in the first portion 8A as compared to the second portion, the base 8 will expand unevenly with the largest expansion in the first portion 8A. As a consequence, the jaws 9 are pressed away from each other without maintaining a parallel orientation of the jaws 9. Instead, the jaws 9 get angled with an angle that is defined by the expansion of the first portion 8A relative to the non-expanded second portion 8B.

Figure 4:
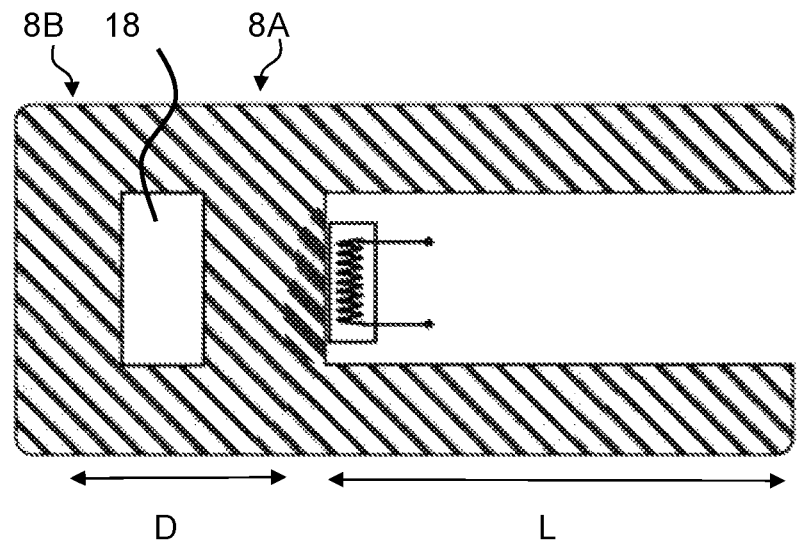
FIG. 4 illustrates a cross section of an alternative embodiment of a clamp unit.
Figure 5:
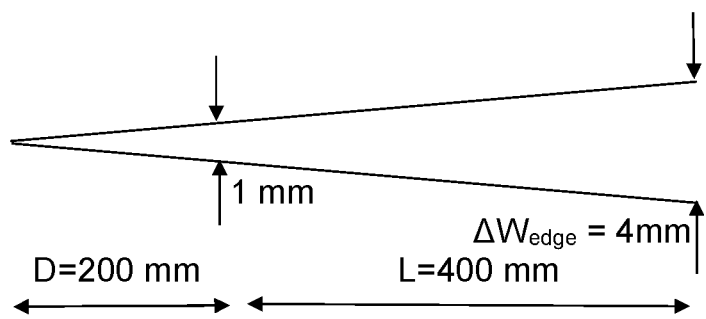
FIG. 5 is an illustration of principles and possible dimensions.

The angled expansion can be better understood with reference to FIG. 4 in combination with FIG. 5. As illustrated in FIG. 4, the base contains a void 18 in between the first portion 8A and the second portion 8B of the base 8. The void 18 acts as a partial insulation between the first portion 8A and the second portion 8B, delaying the thermal energy transfer from the first portion 8A to the second portion 8B. If the first portion expands in the order of 1 mm, and assuming a distance D of 200 mm between the first portion 8A and the second portion 8B and a length L of the jaws of 400 mm, as illustrated in FIG. 5, it is readily recognized by the simple sketch of FIG. 5 that the gap increases by 4 times the expansion of the first portion. Although, the expansion of 1 mm of the first portion and the dimensions in FIG. 5 are not to scale and neither precise but only rough examples for illustration, it gives an impression of the sizes in typical offshore pipe connections as well as the dimensions of the possible expansions of the width of the receptacle.

Figure 3C:
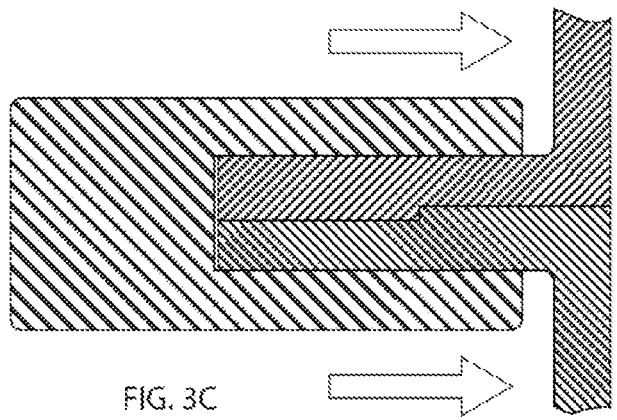
FIG. 3C illustrates the final location of the adjacent flanges in the receptacle.

The increase of the width $W_e$ at the outer edge of the receptacle by several mm facilitates the positioning of the clamp unit 7 over the flanges 2, and also assures that not only is the entire predetermined segment of the flange 2 taken up in the receptacle 10, as illustrated in FIG. 3C, but the flanges 2 are also pressed together by the jaws 9, once the temperature of the first portion 8A returns to ambient temperature, and the base 8 undergoes thermal contraction back to its original state. To the extent the thickness T of the collars 5 allows the jaws 9 to contract again, a resulting elastic force from the base 8 on the jaws 9 remains, which presses the flanges 2 together.

Figure 6A:
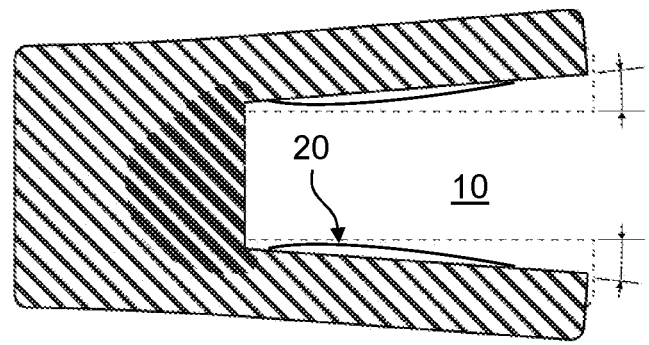
FIG. 6A illustrates a cross section of a clamp unit with a curved surface.
Figure 6B:
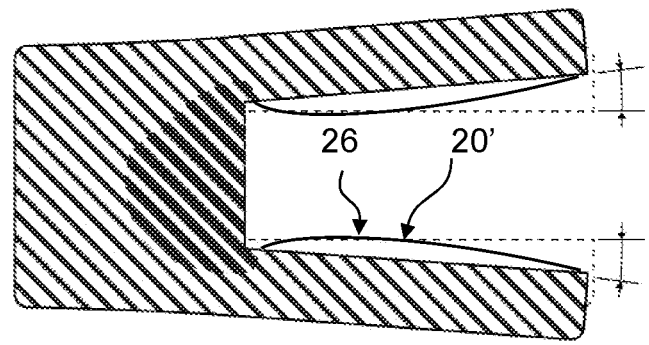
FIG. 6B illustrates a clamp unit with a curved surface blocking access of the flanges despite thermal expansion of the base.

In order to increase the elastic force of the clamp unit 7 on the collars 5 of the flanges 2, the embodiments as sketched in FIGS. 6A and 6B have been found useful. In this case, the inner side 9A of one of the jaws 9 or of both jaws 9 is provide with a curved surface 20.

Figure 7:
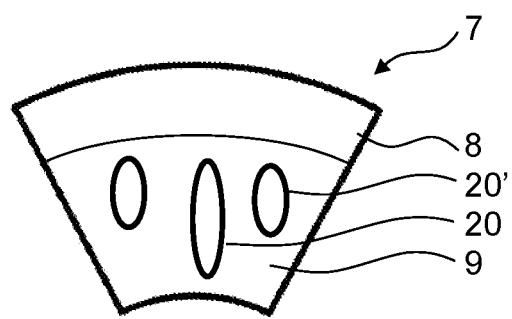
FIG. 7 illustrates curved surfaces as local projections.

The curved surface 20 is optionally provided as a surface profile in the radial direction on the inner side 9A of the entire corresponding jaw 9. Alternatively, not the entire inner side 9A of the entire corresponding jaw 9 is curved, but the curved surface 20 is provided as a projection on the inner surface 9A of the jaw 9. As a further alternative several of such projections 20 are provided on the inner surface 9A of the jaw, as illustrated in FIG. 7.

The curved surface 20 in FIG. 6A is projecting a distance towards and into the receptacle which is less than the increase in width of the receptacle 10 due to the heating and thermal expansion. Thus, despite the curved surface 20, the clamp unit 7 can be positioned over the adjacent flanges 2 in an easy-sliding motion. However, once the base 8 contracts, the curved surface 20, for example in the form of multiple projections, will result in additional elastic force on the flanges 2 so that long term creep of the material will not lead to an untight connection.

In order to enhance the elastic force from the clamp unit, the curved surface may extend into the receptacle 10 a distance more than the width increase by the thermal expansion of the first portion 8A. In this case, which is illustrated in FIG. 6B, the flanges do not get spaced far enough for the adjacent flanges 2 to be taken up freely into the receptacle 10. In this case, the clamp unit 7 is moved over the flanges until the curved surface 20' prevents further advancing of the clamp unit 7 over the flanges 2. In order to advance the clamp unit 7 further, increased advance force is used to press an extreme position 26 of the curved surface 20' past the location where further advancement is blocked. This advancement can be achieved due to the elastic material of the base 8 and/or the jaws 9, which both typically are made of metal. In this embodiment, the relatively large projection 20' adds to the subsequent elastic force that presses the flanges 2 together.

As illustrated in FIG. 6B, the largest reduction in width of the receptacle 10 due to the curved surface 20' with the extreme position 26 is closer to the base 8 than to the edge of the receptacle 10, which is advantageous in that the resulting pressure on the flanges by the jaws is highest near the base.

FIG. 7 illustrates a possible pattern of projections of the two types 20 or 20'. The position and size of the projections as well as type of projections is only used here as an illustrative example and can be provided in different dimensions and configurations.

Figures 8A, 8B:
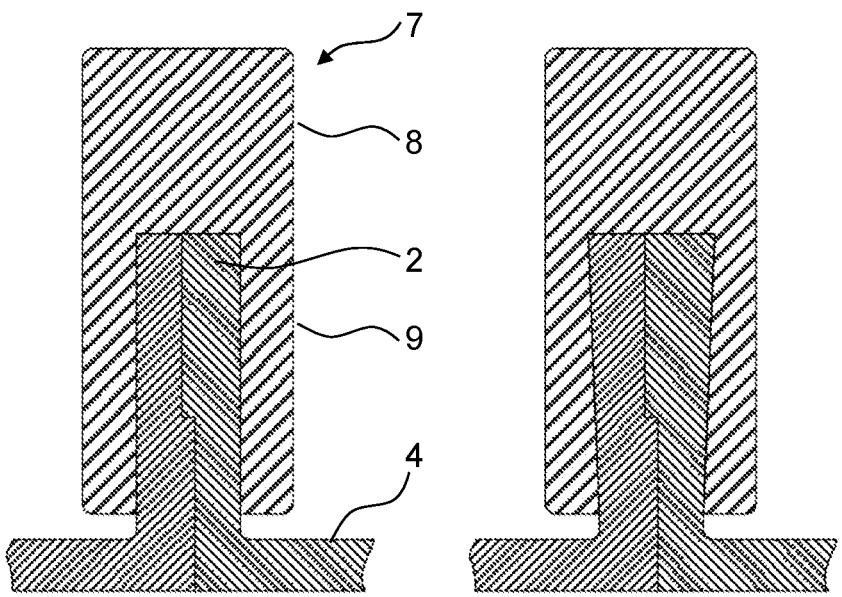
FIGS. 8A, 8B, 8C and 8D illustrate various shapes of clamp units and adjacent flanges.
Figures 8C, 8D:
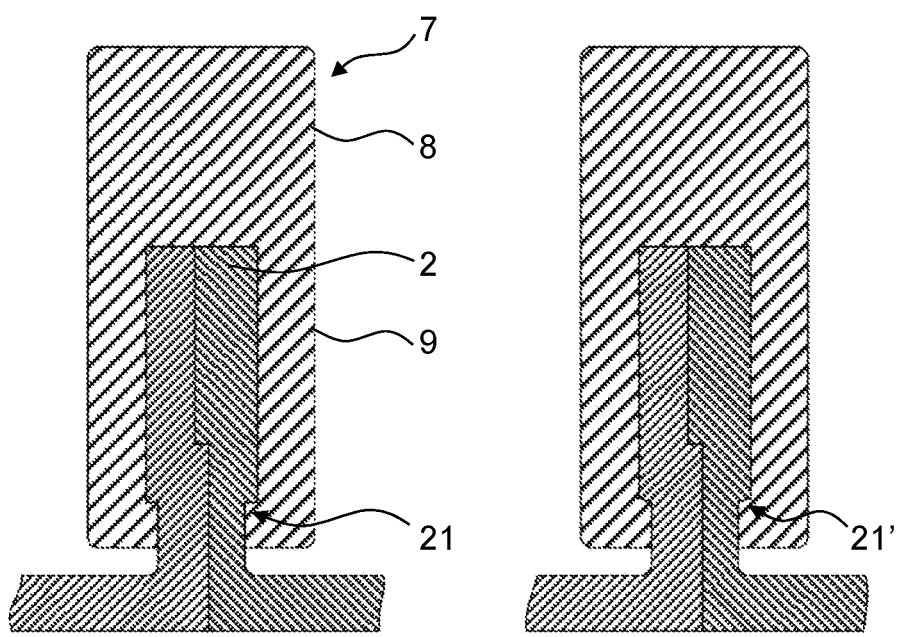

FIGS. 8A-8D illustrate different examples of combinations of flanges 2 and jaws 9. In FIG. 8A, the adjacent flanges 2 extend in parallel and so do the jaws 9 on opposite sides of the receptacle. In FIG. 8B, the flanges 2, for example the collars of flanges 2, increase linearly in thickness with distance from the pipe section 4. Correspondingly, the width of the receptacle increases linearly with radial distance from the pipe section 4. The increase in thickness of the flanges 2 can also increase non-linearly, for example by curving smoothly. In FIG. 8C, an increase in thickness is step-wise and comprises a shoulder 21 of the flanges 2 behind which the jaws 9 hook for optimum fit. In FIG. 8D, a similar configuration is illustrated as in FIG. 8C, however, with a shoulder 21' that is inclined, which eases mounting of the jaws 9 on the flanges 2, especially the fit to the shoulder 21'.

Figure 9A:
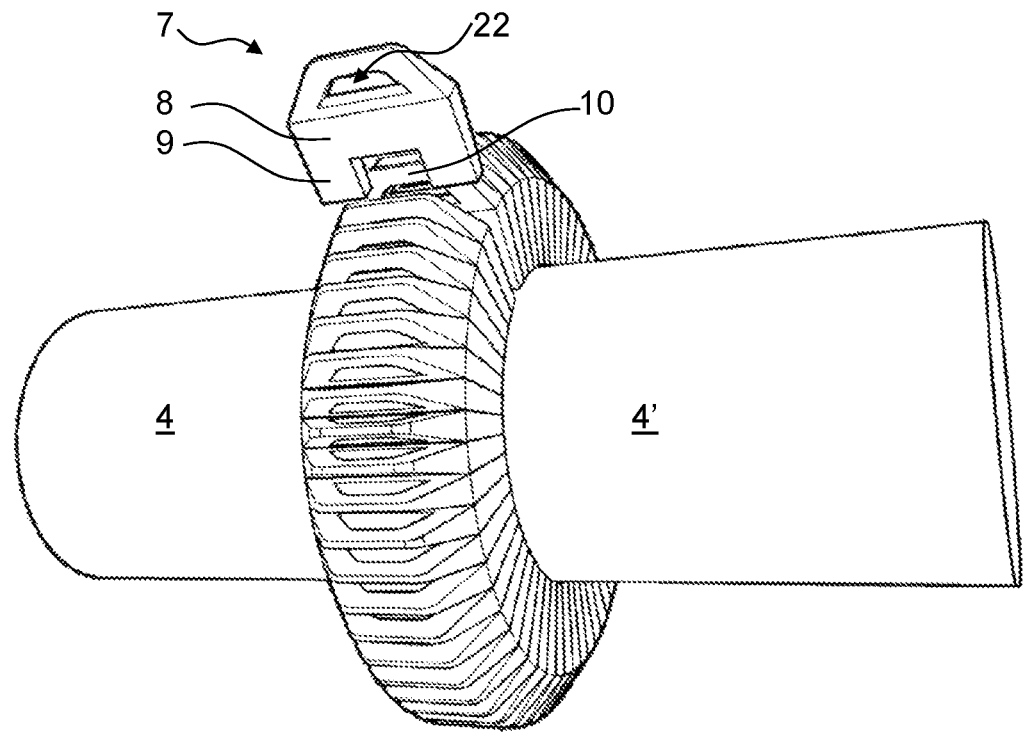
FIG. 9A is a perspective view of clamp units surrounding flanges of two abutting pipe sections.
Figure 9B:
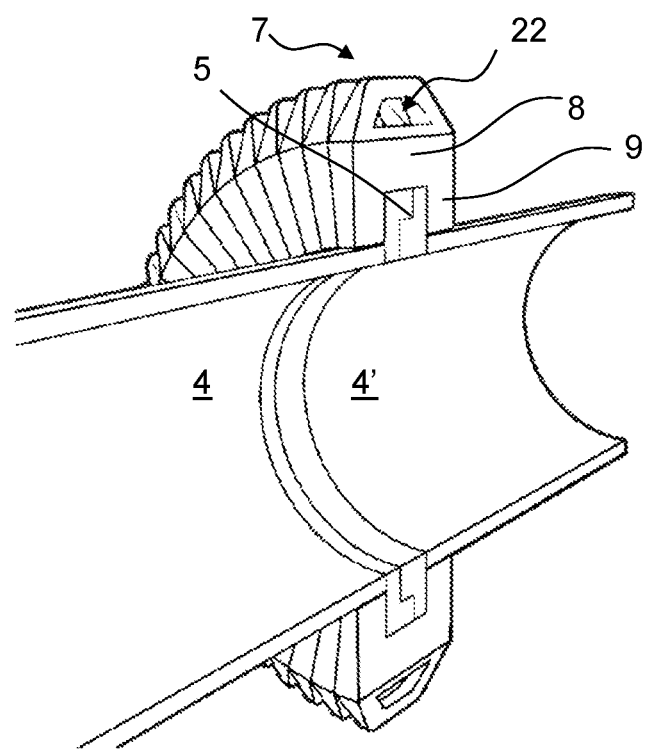
FIG. 9B is a cross section of the embodiment shown in FIG. 9A.

FIGS. 9A and 9B illustrate a further embodiment, where each clamp unit 7 spans only a minor portion of the circumference of the flange 5 on the order of 5-10 degrees of the circle around the pipe section 4. This implies that each clamp unit 7 is less heavy than if the clamp unit spans ⅛ of the circle as illustrated in FIG. 1E. For ease of insertion, the clamp unit 7 comprises a lifting eye 22, for example for lifting by a crane.

Figure 10A:
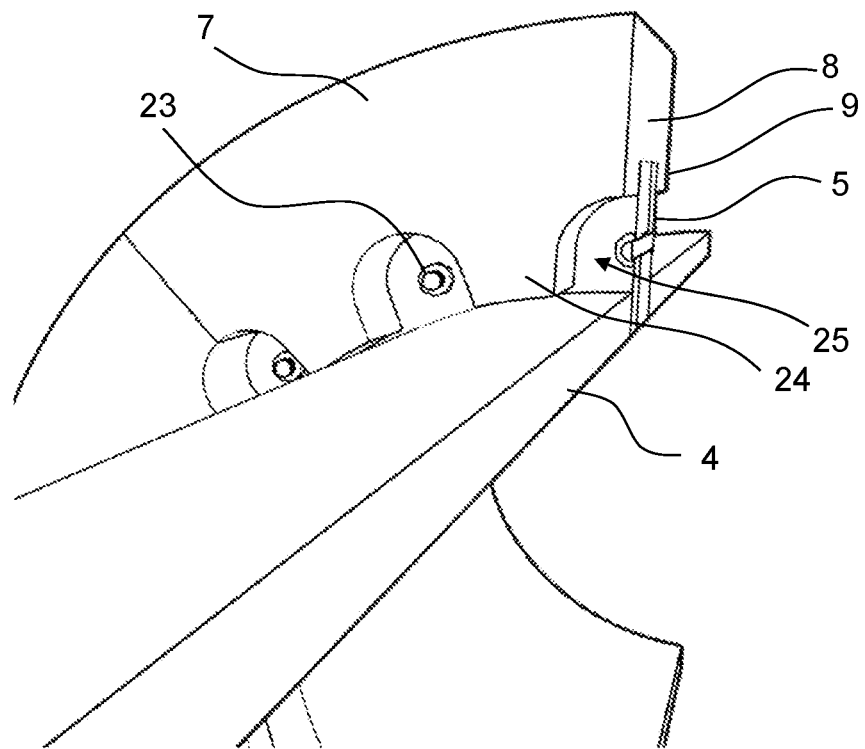
FIG. 10A illustrates a perspective view of a clamp unit having recesses for bolts that assist with securing flanges of pipe sections.
Figure 10B:
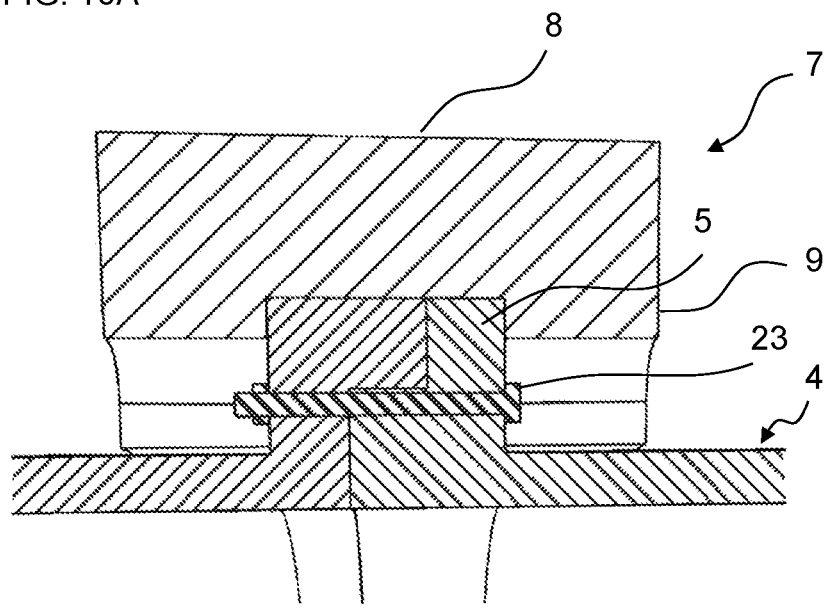
FIG. 10B illustrates a cross section of the embodiment shown in FIG. 10A.

FIG. 10A in perspective view and FIG. 10B in cross sectional view illustrate an embodiment where the clamp unit 7 comprises recesses 25 for giving access to bolt connections 23 that are used as redundant means for pressing the flanges 5 together. In order to optimize the pressure, the clamp units 7 have portions 24 that extend to regions in between the bolt connections 23.

What is claimed is:

1. A method of connecting tubular members, each tubular member having a radially outward projecting flange at its end for connecting the tubular members end-to-end, the method comprising:
   positioning two of the tubular members end-to-end with their flanges aligned and abutting each other, thereby forming adjacent flanges;
   providing a plurality of clamp units and securing the adjacent flanges to each other by positioning the clamp units on various predetermined segments of the adjacent flanges; wherein each clamp unit has a base comprising a first portion from which jaws extend to form a receptacle therebetween for receiving and containing one of the predetermined segments, wherein a width (W) across the receptacle between the jaws is too small for the receptacle to receive the predetermined segment of the adjacent flanges when the first portion of the base is at ambient temperature;
   for receiving the predetermined segment of the adjacent flanges in the receptacle, heating the first portion of the base and by expansion of the first portion increasing the width (W) and positioning the clamp unit with the predetermined segment of the adjacent flanges in the receptacle while the width (W) is increased;
   then, decreasing the width (W) and pressing the adjacent flanges together due to contraction of the jaws;
   wherein the increasing of the width (W) is achieved by thermal expansion of the first portion during the heating of the first portion, and wherein the decreasing of the width (W) is achieved by reducing a temperature of the first portion to ambient temperature and by a corresponding thermal contraction of the first portion.

2. The method according to claim 1, wherein the base has a second portion remote from the jaws, the second portion mechanically connected to the first portion; and wherein the method comprises causing more thermal expansion of the first portion than the second portion by the heating and correspondingly changing an angle between the jaws due to an uneven thermal expansion of the base with a larger increase of the width (W) of the receptacle at an edge of the receptacle distal to the first portion.

3. The method according to claim 2, wherein the first portion and the second portion of the base are portions of a metal block, and wherein the method comprises increasing the temperature in the first portion more than in the second portion by the heating of the first portion.

4. The method according to claim 2, wherein an insulating space is provided between the first portion and the second portion of the base for preventing or delaying transfer of thermal energy from the first portion to the second portion during the heating.

5. The method according to claim 2, further comprising:
   providing the predetermined segment of the adjacent flanges with a profile having a thickness that increases from a smallest to a largest thickness ($T_{max}$) over a distance (D) in an outward radial direction;
   providing the receptacle with a corresponding internal profile with increasing width (W) to a maximum width ($W_{max}=T_{max}$) towards the base over a corresponding distance (D); and
   increasing an angle between the jaws due to the uneven thermal expansion of the base causing a larger increase of the width of the receptacle at the edge than closer to the first portion, for passing the edge of the receptacle over the predetermined segment at a position of the largest thickness ($T_{max}$).

6. The method according to claim 5, wherein the thickness of the predetermined segment increases linearly from the smallest to the largest thickness ($T_{max}$) over the distance D.

7. The method according to claim 1, wherein the predetermined segment of the adjacent flanges has a largest thickness ($T_{max}$) and wherein the width (W) is increased by the heating to at least ($T_{max}$) for fitting the clamp unit over the predetermined segment.

8. The method according to claim 1, wherein the jaws, prior to heating, have parallel sides towards the receptacle and provide a constant width ($W_0$) across the receptacle when the first portion is at ambient temperature, wherein the predetermined segment has a constant thickness ($T_0>W_0$), and wherein the width (W) of the receptacle is increased to larger than the thickness $T_0$.

9. The method according to claim 1, wherein at least one of the jaws has a convex curved surface on a side towards the receptacle with an extreme position that defines a minimum width ($W_{min}$) of the receptacle; wherein the minimum width ($W_{min}$) of the receptacle is increased by the thermal expansion such that the flanges pass the convex curved surface.

10. The method according to claim 9, wherein the extreme position of the convex curved surface is closer to the base than to an edge of the receptacle opposite the first portion.

11. The method according to claim 9, wherein the convex curved surface is a projection extending over only a part of a length of the receptacle when measured in a direction along a polar angle ($\Theta$) about a central axis of the tubular member when the clamp unit is mounted on the adjacent flanges.

12. The method according to claim 1, wherein at least one of the jaws has a convex curved surface on a side towards the receptacle; wherein the method comprises:
   increasing the width (W) of the receptacle by the thermal expansion to receive only a part of the predetermined segment between the jaws but not enough for the predetermined segment to pass an extreme position of the convex curved surface towards a predetermined final location of the predetermined segment inside the receptacle, wherein the extreme position defines a minimum width ($W_{min}$) of the receptacle;
   advancing the clamp unit with an advance force that overcomes an elastic force of the jaws and pressing the jaws away from each other for the predetermined segment to pass the extreme position,
   then increasing the elastic force of the jaws at the extreme position by reducing the temperature of the first portion to ambient temperature.

13. The method according to claim 12, wherein ($W_{min}$) is in a range of 0.5-3 mm smaller than a width necessary for the predetermined segment to pass the extreme position freely into the receptacle.

14. The method according to claim 1, wherein the flanges are provided with a plurality of bolt holes about the tubular member, and the method comprises providing bolts through the bolt holes and tightening the bolts as an additional measure for securing the flanges to each other, wherein the jaws of each clamp unit have recesses that leave areas free around the bolts for tightening the bolts.

15. The method according to claim 1, wherein the heating of the first portion utilizes a heater adjacent to the first portion in between the jaws and the heater is removed prior to mounting the clamp unit on the adjacent flanges.

16. The method according to claim 1, wherein each clamp unit spans an angular segment of the adjacent flanges of no more than ⅙ of a circumference of the adjacent flanges, and wherein the method comprises positioning at least three clamp units with equal angular distance on the adjacent flanges about the tubular members.

17. The method according to claim 1, wherein a diameter of the tubular member is larger than 2000 mm.

18. The method according to claim 1, wherein
- a length of the jaws is in a range of 100-400 mm; and
- the width (W) across the receptable between the jaws is in a range of 200-600 mm.

19. The method according to claim 1, further comprising heating the first portion to a temperature in a range of 150° C.-300° C. for increasing the width (W) in a range of 0.5-3 mm at an edge of the receptacle.

* * * * *